(12) United States Patent
Kritt et al.

(10) Patent No.: US 9,678,638 B2
(45) Date of Patent: Jun. 13, 2017

(54) GUIDING GESTURE OPERATIONS

(71) Applicant: LENOVO ENTERPRISE SOLUTIONS (SINGAPORE) PTE. LTD., New Tech Park (SG)

(72) Inventors: Barry Alan Kritt, Raleigh, NC (US); Sarbajit Kumar Rakshit, Kolkata (IN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 766 days.

(21) Appl. No.: 14/051,629

(22) Filed: Oct. 11, 2013

(65) Prior Publication Data
US 2015/0106709 A1   Apr. 16, 2015

(51) Int. Cl.
G06F 3/048 (2013.01)
G06F 3/0484 (2013.01)
G06F 3/0488 (2013.01)

(52) U.S. Cl.
CPC ........ *G06F 3/0484* (2013.01); *G06F 3/04883* (2013.01)

(58) Field of Classification Search
None
See application file for complete search history.

(56) References Cited

U.S. PATENT DOCUMENTS

| 8,149,249 | B1 | 4/2012 | Oplinger | |
| 2005/0116966 | A1* | 6/2005 | Graham | G06F 17/30241 345/661 |
| 2006/0026535 | A1* | 2/2006 | Hotelling | G06F 3/0418 715/863 |
| 2010/0070857 | A1* | 3/2010 | Kohar | G06F 3/0481 715/705 |
| 2010/0289825 | A1* | 11/2010 | Shin | G06F 3/04845 345/667 |
| 2013/0088435 | A1 | 4/2013 | Sia | |

FOREIGN PATENT DOCUMENTS

CN   102541319   12/2010

* cited by examiner

*Primary Examiner* — Tuan S Nguyen
(74) *Attorney, Agent, or Firm* — Kunzler Law Group

(57) ABSTRACT

A method, system, and computer program product for guiding gesture operations are provided in the illustrative embodiments. An initial position of a gesture is determined. The gesture is a touch-based gesture made by a user relative to a touch-sensitive interface of a data processing system. The gesture is made to manipulate data presented using the data processing system. A set of gesture size adjustments is determined. A set of data adjustments to be made to the data is computed. An adjustment in the set of data adjustments corresponds to an adjustment in the set of gesture size adjustments. The set of gesture size adjustments and the corresponding set of data adjustments are presented as a guide relative to the initial position of the gesture. The guide informs the user about an expected result of a member gesture size adjustment before the user makes the gesture size adjustment.

20 Claims, 7 Drawing Sheets

GUIDING GESTURE OPERATIONS

TECHNICAL FIELD

The present invention relates generally to a method, system, and computer program product for improving interactions with visual information. More particularly, the present invention relates to a method, system, and computer program product for guiding gesture operations.

BACKGROUND

Some data processing systems provide a touch-sensitive interface as a way for a user to interact with the data processing system. A user can touch the touch-sensitive interface in different ways, forming different touch-based gestures (gestures), to communicate different inputs to the data processing system.

Touch-based gestures are commonly used with to manipulate visual information. For example, gestures to tap to select, pinch to close an application, swipe to scroll, and pinch to zoom are common on devices and data processing systems with touch-sensitive interfaces.

Different gestures use different motions, touches, and number of touches to communicate different inputs to the data processing system. For example, some gestures use a touch of a single finger, such as in a tap gesture. Some other gestures comprise multiple fingers and motions, such as a pinching or a spreading motion of two fingers.

SUMMARY

The illustrative embodiments provide a method, system, and computer program product for guiding gesture operations. An embodiment determines an initial position of a gesture, wherein the gesture is a touch-based gesture made by a user relative to a touch-sensitive interface of a data processing system, and wherein the gesture is made to manipulate data presented using the data processing system. The embodiment further determines a set of adjustments to a size of the gesture, forming a set of gesture size adjustments. The embodiment further computes, using a processor and a memory, a set of adjustments to be made to the data, forming a set of data adjustments, wherein an adjustment in the set of data adjustments corresponds to an adjustment in the set of gesture size adjustments. The embodiment further presents, as a guide, the set of gesture size adjustments and the corresponding set of data adjustments relative to the initial position of the gesture, wherein the guide is usable for informing the user about an expected result of a member gesture size adjustment in the set of gesture size adjustments before the user makes the gesture size adjustment.

Another embodiment includes a computer usable storage device including computer usable code for guiding gesture operations. The embodiment further includes computer usable code for determining an initial position of a gesture, wherein the gesture is a touch-based gesture made by a user relative to a touch-sensitive interface of a data processing system, and wherein the gesture is made to manipulate data presented using the data processing system. The embodiment further includes computer usable code for determining a set of adjustments to a size of the gesture, forming a set of gesture size adjustments. The embodiment further includes computer usable code for computing, using a processor and a memory, a set of adjustments to be made to the data, forming a set of data adjustments, wherein an adjustment in the set of data adjustments corresponds to an adjustment in the set of gesture size adjustments. The embodiment further includes computer usable code for presenting, as a guide, the set of gesture size adjustments and the corresponding set of data adjustments relative to the initial position of the gesture, wherein the guide is usable for informing the user about an expected result of a member gesture size adjustment in the set of gesture size adjustments before the user makes the gesture size adjustment.

Another embodiment includes a storage device including a storage medium, wherein the storage device stores computer usable program code. The embodiment further includes a processor, wherein the processor executes the computer usable program code. The embodiment further includes computer usable code for determining an initial position of a gesture, wherein the gesture is a touch-based gesture made by a user relative to a touch-sensitive interface of a data processing system, and wherein the gesture is made to manipulate data presented using the data processing system. The embodiment further includes computer usable code for determining a set of adjustments to a size of the gesture, forming a set of gesture size adjustments. The embodiment further includes computer usable code for computing, using a processor and a memory, a set of adjustments to be made to the data, forming a set of data adjustments, wherein an adjustment in the set of data adjustments corresponds to an adjustment in the set of gesture size adjustments. The embodiment further includes computer usable code for presenting, as a guide, the set of gesture size adjustments and the corresponding set of data adjustments relative to the initial position of the gesture, wherein the guide is usable for informing the user about an expected result of a member gesture size adjustment in the set of gesture size adjustments before the user makes the gesture size adjustment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
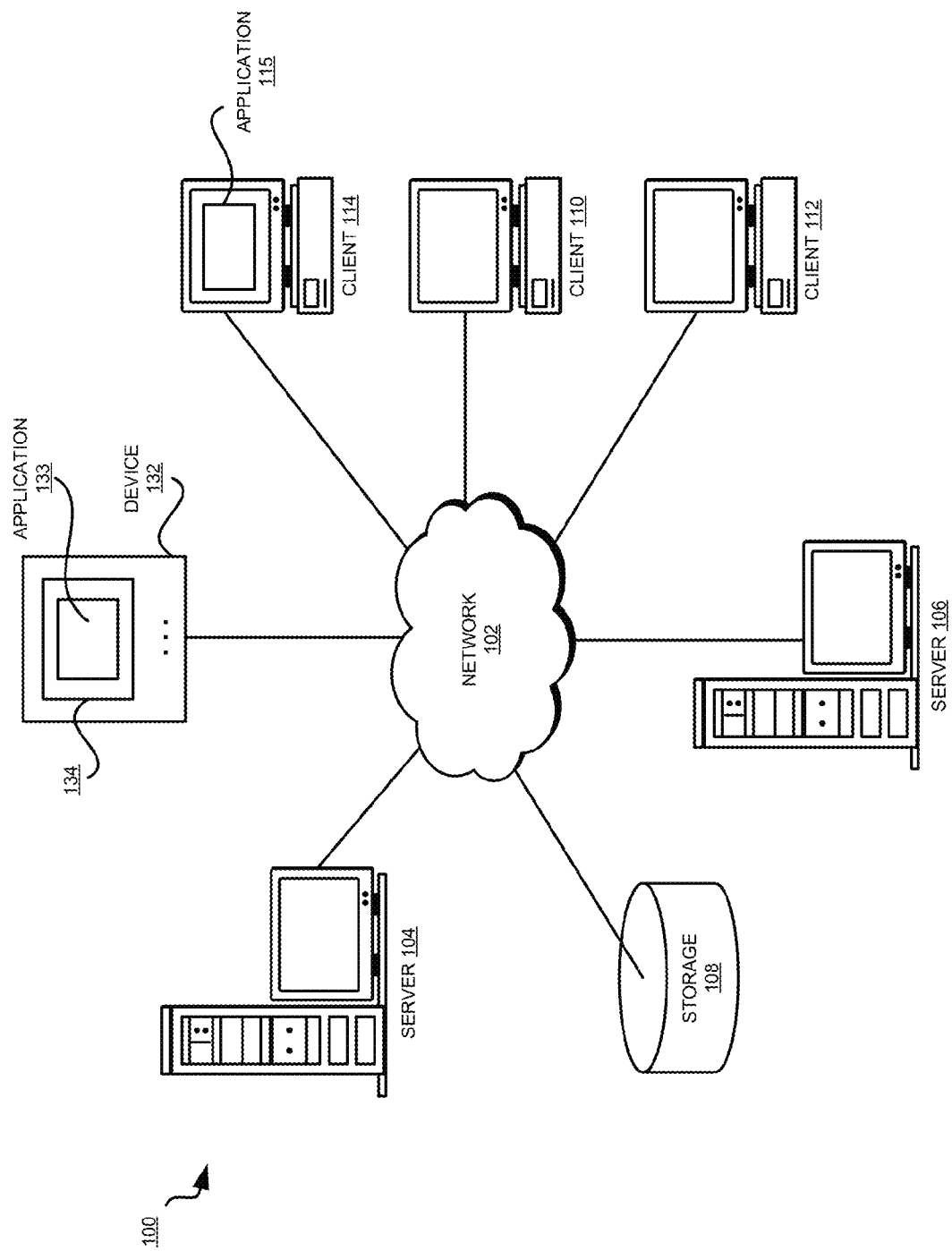
FIG. 1 depicts a block diagram of a network of data processing systems in which illustrative embodiments may be implemented.

The illustrative embodiments recognize that some gestures are sensitive to the size or amplitude of the gesture. For example, a swipe gesture can be short or long swipe. A swipe that is shorter than a threshold distance may communicate one input and a swipe that is longer than the threshold distance may communicate another input. A hard press and a soft tap may communicate different inputs to a data processing system.

The illustrative embodiments further recognize that a size of a multi-touch gesture, such as a pinch, spread, or rotation, can also communicate different inputs to the data processing system. For example, a spread gesture of two fingers spanning smaller than a threshold distance can communicate one level of zooming, and a spread gesture spanning longer than the threshold distance can communicate a different level of zooming.

Some presently used gestures are responsive to the size of the gesture. However, the illustrative embodiments recognize that prior to making the gesture, the user receives no information about effects of the different sizes of the user's gestures. For example, a user presently knows that a spread gesture will cause underlying visual information, such as a picture or a document, to zoom. However, the user does not know how much spread corresponds to how much zoom. For example, the user does not know whether a spread approximately half inch wide corresponds to twenty percent zoom or fifty percent zoom, or how much the spread should be to achieve a one hundred percent zoom level.

The illustrative embodiments used to describe the invention generally address and solve the above-described problems and other problems related to the touch-based gestures. The illustrative embodiments provide a method, system, and computer program product for guiding gesture operations.

The illustrative embodiments recognize that many gestures, such as the two-finger pinching zoom, two-finger pivoted rotation, or a single or multi-finger swipe also suffer from similar deficiencies. For example, when performing a rotation gesture, presently a user does not know how much rotation motion corresponds to how much rotation of the underlying picture. Presently used gestures do not provide any guidance to the user about the sizes or size-range possible for the gesture and the corresponding effects that can be expected on the underlying data.

The illustrative embodiments further recognize that the size of a gesture can be tunable. For example, the size of the gesture is relative to a size of the touch-sensitive interface. A one-half inch wide spread gesture on a three inch wide interface may not have the same effect on the same underlying data as a one-half inch wide spread gesture on a twenty two inch wide touch-sensitive interface. The illustrative embodiments recognize that the size of the effect that a corresponding size of a gesture is to have should be scalable or tunable by a user so that the end result of the gesture input matches with the user's expectations.

The size, amplitude, pressure, spacing, motion distance, hover distance, and pitch or frequency of touch, are some examples attributes of touch-based gestures contemplated within the scope of the illustrative embodiments. These and other similar attributes of gestures are collectively referred to as a size of a gesture or a size of a gesture adjustment. When necessary for clarity, the description specifies the type of the size of the gesture. A corresponding effect on data with respect to which the gesture is made is referred to herein as data adjustment. Zooming the data, rotating the data, shifting or moving the data, and stretching the data are some examples of data adjustments within the scope of the illustrative embodiments. An amount of the adjustment effected on the data is referred to herein as a size of data adjustment.

An embodiment detects an initial placement of a gesture, such as an initial placement of one or more fingers relative to a touch-sensitive interface. The embodiment computes one or more sizes of gesture adjustments and corresponding one or more data adjustments that would result. The embodiment displays the computed sizes of gesture adjustments and the corresponding data adjustments to be expected relative to the initial placement of the gesture.

For example, if the user is about to make a spreading gesture to zoom an image, the user places the thumb and an index finger on a touch screen. An embodiment senses the initial placement of the thumb and the index finger, including an initial spread distance between the thumb and the finger. The embodiment computes, for example, three different spread positions larger than the initial spread distance and shows the different spread positions as concentric circles around the initial position. The embodiment also computes a zoom-in ratio that corresponds to those three spread positions. The embodiment displays the zoom-in ratios relative to their respective spread positions on the display. An embodiment can similarly compute different spread positions smaller than the initial spread distance for a zoom-out operation.

In this manner, an embodiment enables the user to know how far to spread to achieve a desired level of zoom-in or zoom-out data adjustment. For example, the user may spread the thumb and the index finger up to a concentric circle to achieve a zoom-in or zoom-out level corresponding to that concentric circle. Alternatively, the user may spread the finger and the thumb to a distance between two concentric circles to achieve a proportional intermediate zoom level.

The illustrative embodiments are described with respect to certain gestures, sizes, interfaces, devices, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
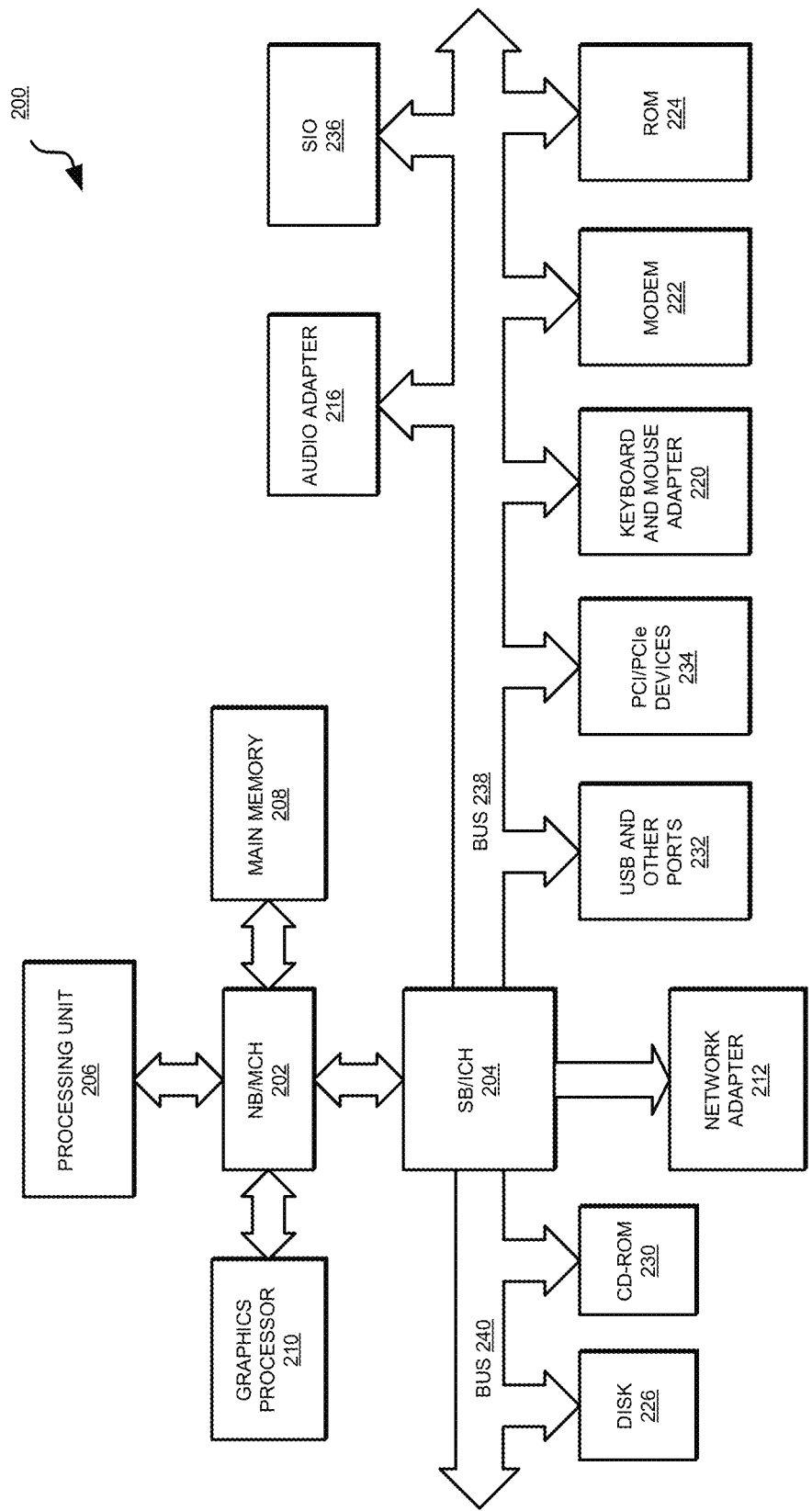
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. In one example configuration, device 132 is a data processing device, such as a smartphone or a tablet computing platform, which provides touch-sensitive interface 134 for gesture inputs. Application 133 implements an embodiment to operate within, or in conjunction with, device 132. Generally, any suitable device, data processing system, or a component thereof, can use a touch-sensitive interface, and therefore can also implement or use an embodiment without limitation. For example, in another example configuration, data processing system 114 includes application 115, which implements an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

Data processing system 200 is also representative of a device, such as device 132 in FIG. 1 in which computer usable program code or instructions implementing the processes of the illustrative embodiments may be located for the illustrative embodiments. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, NLP engine 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
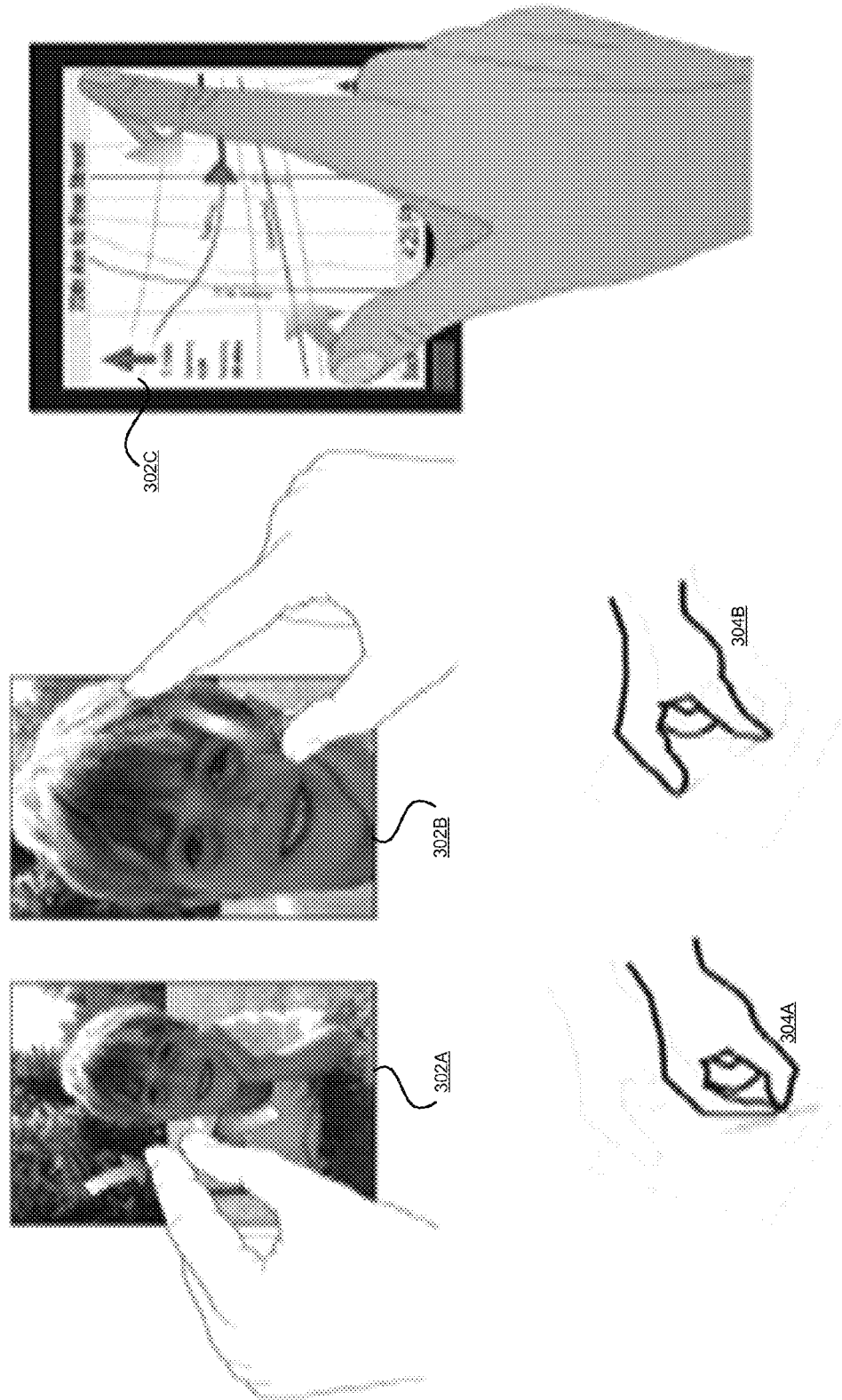
FIG. 3 depicts a block diagram of an example gesture that can be improved using an illustrative embodiment.

With reference to FIG. 3, this figure depicts a block diagram of an example gesture that can be improved using an illustrative embodiment. Image 302A, 302B, and 302C each is an example of data that can be adjusted or manipulated using gestures. Images 302A-C can be displayed using touch-sensitive interface 134 associated with device 132 or a comparable interface implemented with data processing system 114 in FIG. 1.

Gestures 304A and 304B are example pinch and spread gestures that can be applied to any data to be adjusted, such as any of images 302A, 302B, and 302C. FIG. 3 shows gesture 304A applied to images 302A and 302C, and gesture 304B applied to image 302B. The interfaces used to display images 302A and 302C are of different sizes as can be seen, and gesture 304A as applied to image 302A is of a different size as compared to gesture 304A as applied to image 304C.

As recognized by the illustrative embodiments, and as depicted in FIG. 3, the present solutions for gestures-based inputs do not provide prior guidance to the user about the correspondence between the sizes of the user's gestures and the sizes of the corresponding data adjustments. For example, gesture 304A as applied to image 302A shows an end-result where the data of the image shows a zoomed-out image. Gesture 304B as applied to image 302B shows an end-result where the data of the image shows a zoomed-in image. However, in neither case, and for that matter nor in the case of image 302C, does the present solution for gestures-based inputs provide any prior guidance as to the end-results achieved by the gestures in each case.

The present solutions only present to the use the end-result, and leave the user to guess how the system responded to the size of the gesture and estimate how much data adjustment occurred. Disadvantageously, using a presently available solution for gestures-based input, a user often has to try a gesture several times, attempting different sizes of the gesture, to achieve an end-result that the user had expected.

Figure 4:
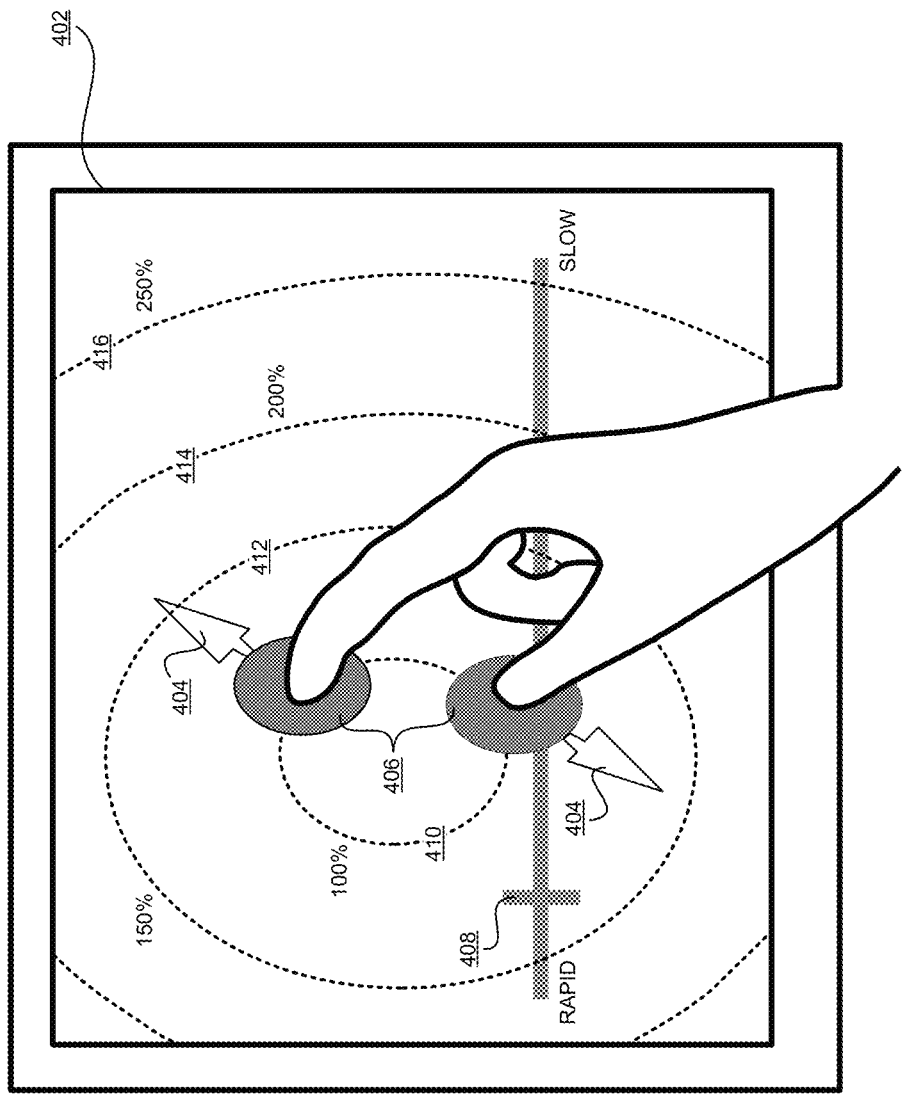
FIG. 4 depicts a block diagram of guiding gesture operations in accordance with an illustrative embodiment.

With reference to FIG. 4, this figure depicts a block diagram of guiding gesture operations in accordance with an illustrative embodiment. Interface 402 is a touch-sensitive interface, such as interface 134 in FIG. 1, or a similar interface used with client 114 in FIG. 1. Gesture 404 is shown as a two-finger spread gesture, and is an example of gesture 304B in FIG. 3. Gesture 404 is used only as an example without implying a limitation on the illustrative embodiments thereto.

Any type of data can be presented and adjusted using interface 402 and gesture 404. As an example, images 302A, 302B, and 302C can be presented using interface 402.

An application implementing an embodiment, such as application 133 or 115 in FIG. 1, measures initial placement 406, including a spread distance between the finger and the thumb in gesture 404. For example, the touch point of the thumb can be considered as a reference point and the distance between the reference point and the touch point of the index finger can be the spread distance of gesture 404.

The application presents scale 408 with a slider. A user manipulates the slider on scale 408 to adjust a degree of correspondence between a size of a gesture and a size of data adjustment presented on interface 402.

In one example embodiment, scale 408 offers a selectable range of settings. In the depicted example of such an embodiment, the range limits are marked "rapid" and "slow" as examples. A setting of the slider between the "rapid" and "slow" ends causes a threshold proportionality between the size of gesture 404 and the size of data adjustment. A setting of the slider towards the "rapid" end causes a greater than the threshold proportionality, and a setting towards the "slow" end of scale 408 cause a less than the threshold proportionality to be effective for gesture 404.

In one embodiment, the application determines that size 410 of gesture 404, which is the spread distance of initial placement 406, corresponds to the present level of data display, for example, default one hundred percent zoom level. In another embodiment, the spread distance of initial placement 406 corresponds to whatever the zoom level or initial state of the presented data may be. For example, if the data were originally presented zoomed-in at two hundred percent (not shown) before any gestures are made, size 410 would correspond to the originally presented zoomed-in level of two hundred percent.

Upon measuring size 410 of initial placement 406 and a position selected on scale 408, the application computes a set of different sizes of gesture 404. In the example depiction of FIG. 4, the application computes sizes 412, 414, and 416. When the gesture is adjusted to size 412, the underlying data is adjusted to a zoomed-in level of one hundred and fifty percent. Similarly, at gesture size 414, the data is adjusted to two hundred percent zoom, and at gesture size 416, the data is adjusted to two hundred and fifty percent zoom.

In one embodiment, the sizes of gesture adjustment, to wit, sizes 412, 414, and 416 are displayed on interface 402 as guides. In one example, as shown, the guides take the form of concentric circles. The guides can be any visible, tactile, or even audible guide markings displayed statically overlaid on the underlying data or in other suitable manner.

In one embodiment (not shown), additional aids are provided so that the user can avoid having to span the distance to the various concentric circles or equivalent thereof. For example, the embodiment presents each concentric circle in different colors. The embodiment further presents a series of color tabs, each color tab corresponding to one colored concentric circle. The color tabs are presented close to the gesture's initial position, such as between the thumb and the index position in initial placement 406 as shown. Depending on which concentric circle the user wishes to span the fingers to, the user can instead tap or select the corresponding color tab, thereby making a smaller adjustment to the gesture as compared to the adjustment to reach the desired concentric circle.

Figure 5:
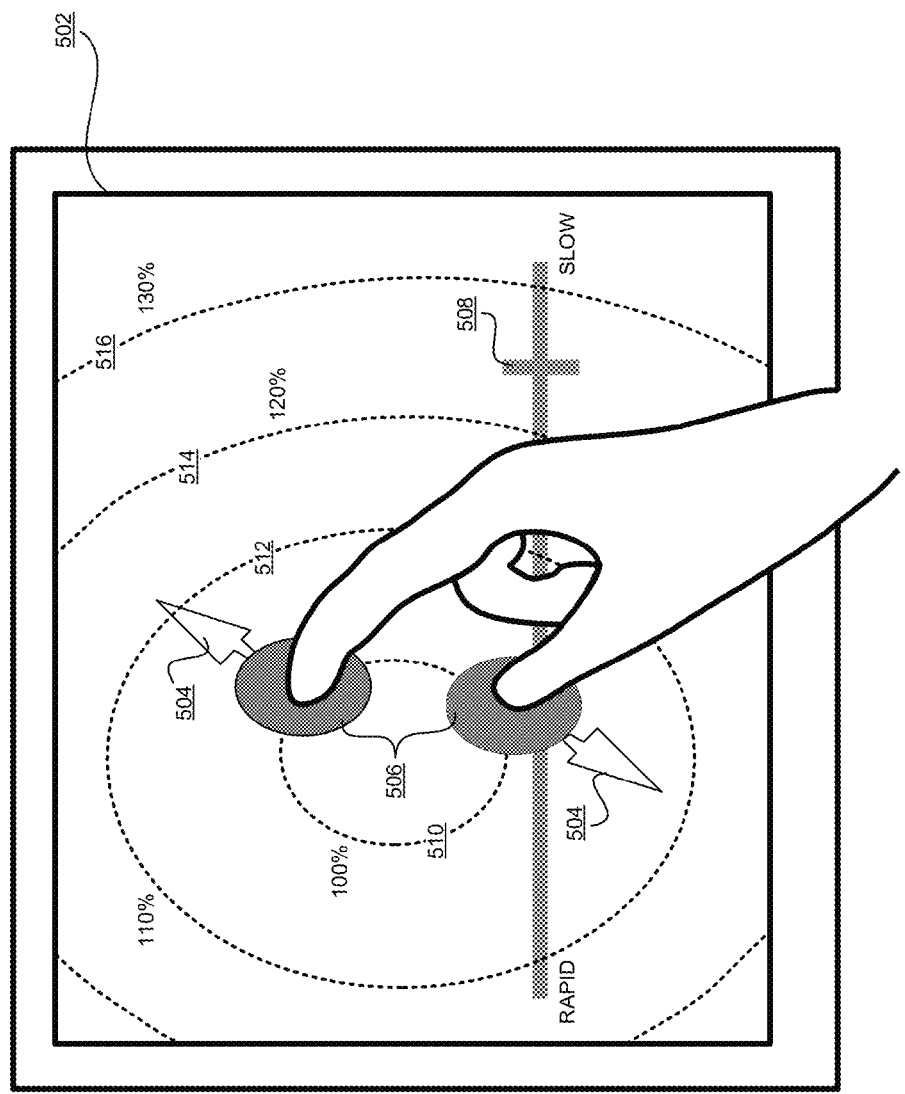
FIG. 5 depicts a block diagram of another example of guiding gesture operations in accordance with an illustrative embodiment.

With reference to FIG. 5, this figure depicts a block diagram of another example of guiding gesture operations in accordance with an illustrative embodiment. Interface 502 is similar to interface 402 in FIG. 4. Gesture 504 is shown as a two-finger spread gesture, and is another example of gesture 404 in FIG. 4. Gesture 504 is used only as an example without implying a limitation on the illustrative embodiments thereto.

Any type of data can be presented and adjusted using interface 502 and gesture 504. As an example, images 302A, 302B, and 302C can be presented using interface 502.

An application implementing an embodiment, such as application 133 or 115 in FIG. 1, measures initial placement 506, including a spread distance between the finger and the thumb in gesture 504. The application presents scale 508 with a slider similar to scale 408 in FIG. 4.

The depiction of FIG. 4 showed the slider at the "rapid" end of scale 408 corresponding to example data adjustments in steps of fifty percent at sizes 412, 414, and 416. In FIG. 5, the slider is moved to the "slow" end of scale 508. The application thereby reduces the degree of correspondence between a size of a gesture and a size of data adjustment presented on interface 502 from the degree of correspondence in FIG. 4.

In one embodiment, the application determines that size 510 of gesture 504, which is the spread distance of initial placement 506, corresponds to the present level of data display, for example, default one hundred percent zoom level. In another embodiment as described earlier, the spread distance of initial placement 506 corresponds to whatever the zoom level or initial state of the presented data may be.

Upon measuring size 510 of initial placement 506 and a position selected on scale 508, the application computes a set of different sizes of gesture 504. In the example depiction of FIG. 5, the application computes sizes 512, 514, and 516. When the gesture is adjusted from size 510 to size 512, the underlying data is adjusted to a zoomed-in level of one hundred and ten percent, as reduced from one hundred and fifty percent at size 412 in FIG. 4. Similarly, at gesture size 514, the data is adjusted to one hundred and twenty percent zoom, and at gesture size 516, the data is adjusted to one hundred and thirty percent zoom.

In one embodiment, the sizes of gesture adjustment, to wit, sizes 510, 512, 514, and 516 are displayed on interface 502 as guides. The guides can take any suitable form, including but not limited to the dotted concentric visible circles as shown, within the scope of the illustrative embodiments.

The spreading type of the depicted gestures, the zooming nature of the operation corresponding to those gestures, the various sizes of the gestures, and the corresponding various zoom levels of the underlying data, are all examples and not intended to be limiting on the illustrative embodiments. Those of ordinary skill in the art will be able to conceive many other gestures, data adjustments, and sizes of the gestures and data adjustments, from this disclosure, and the same are contemplated within the scope of the illustrative embodiments. The sliders and scales are shown only as an example manner of making a scaling selection. Any suitable method for making a scaling selection, such as by using a rotating dial, can be used for a similar purpose within the scope of the illustrative embodiments.

Figure 6:
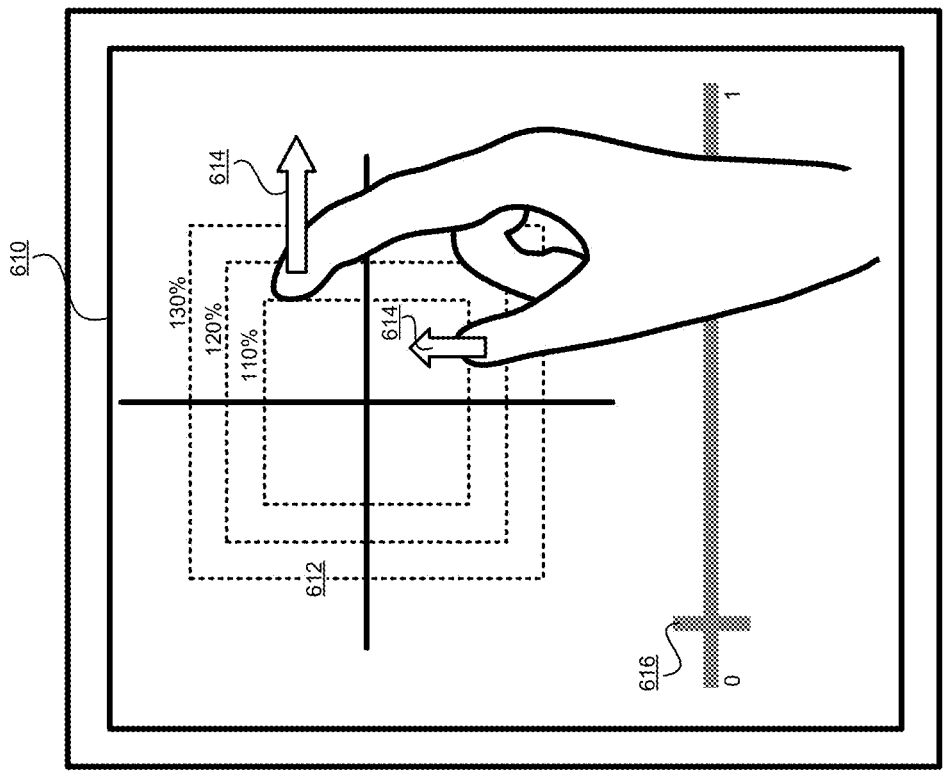
FIG. 6 depicts some examples of guides that can be used for guiding gesture operations in accordance with an illustrative embodiment.
Figure 6:
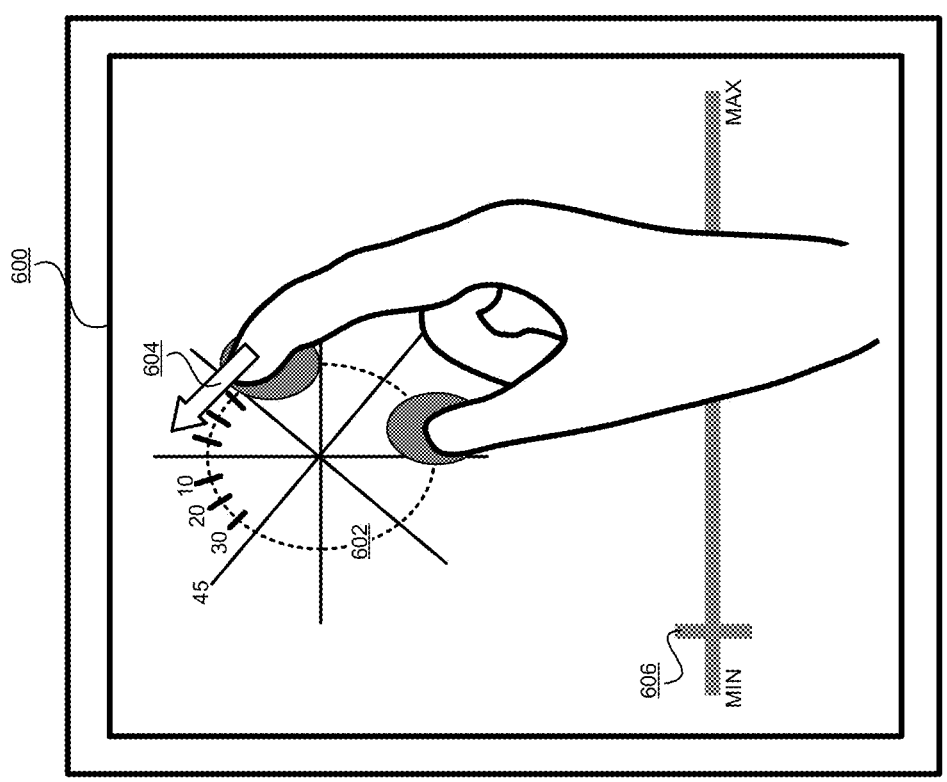

With reference to FIG. 6, this figure depicts some examples of guides that can be used for guiding gesture operations in accordance with an illustrative embodiment. Interface 600 is an example of interface in FIG. 5.

Guide 602 is presented on interface 600 in response to gesture 604. Only as an example, gesture 604 is a two-finger rotation gesture, such as a rotation gesture used to rotate a picture.

An application implementing an embodiment, such as application 115 or 133 in FIG. 1, detects gesture 604 as a rotation gesture. The application further detects a selection made by the user on scale 606. The application presents guide 602 with radial markings at various degrees, showing how much adjustment in the gesture size, e.g., how much rotation of gesture 604, corresponds to the depicted degrees of rotation adjustment in the underlying data.

Interface 610 is another example of interface in FIG. 5. Guide 612 is presented on interface 610 in response to gesture 614. Only as an example, gesture 614 is a two-finger stretching gesture, such as to stretch a picture along only one axis.

An application implementing an embodiment, such as application 115 or 133 in FIG. 1, detects gesture 614 as a stretching gesture. The application further detects a selection made by the user on scale 616. The application presents guide 612 as concentric rectangular lines whose sides are parallel to the X and Y axes. The guide lines parallel to the axes at various distances indicate the various size changes in gesture 614 along those axes, and show the corresponding stretching adjustment in the underlying data.

Figure 7:
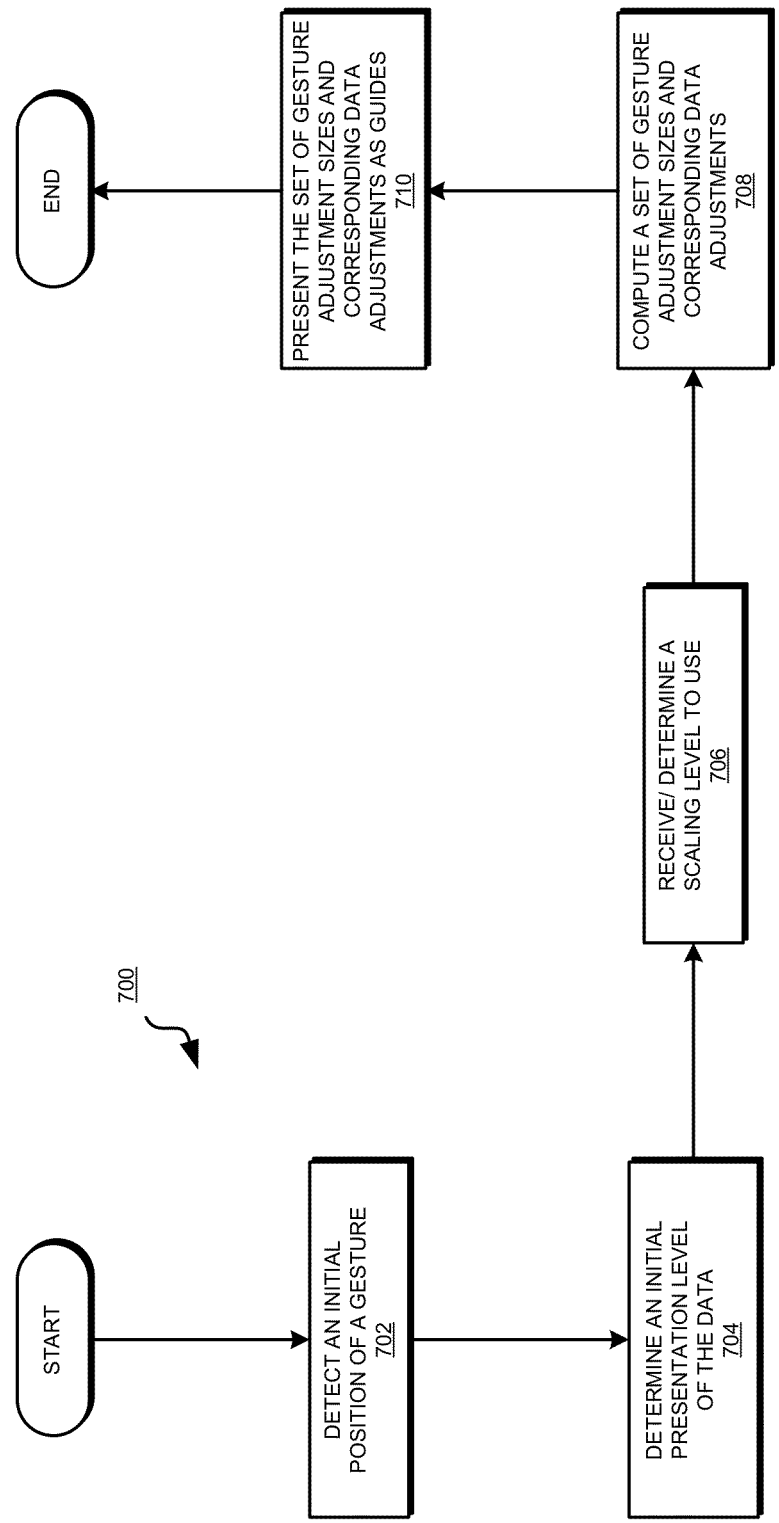
FIG. 7 depicts a flowchart of an example process for guiding gesture operations in accordance with an illustrative embodiment.

With reference to FIG. 7, this figure depicts a flowchart of an example process for guiding gesture operations in accordance with an illustrative embodiment. Process 700 can be implemented in application 115 or 133 in FIG. 1.

The application begins process 700 by detecting an initial position or placement of a gesture (block 702). The application determines an initial presentation level of the underlying data (block 704). For example, the application determines whether the data is to be deemed at a default presentation level, such as a default level of zoom, default tilt or rotation angle, or other default presentation levels possible with other types of data.

The application determines, or receives from a scaling selector, a scaling level to use for presenting the guide for gesture size adjustments (block 706). The application computes a set of sizes of gesture adjustments and the corresponding data adjustments (block 708). The application presents the set of sizes of gesture adjustments and the corresponding data adjustments as guides for making the gesture adjustments (block 710). The application ends process 700 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for guiding gesture operations. An embodiment allows a user to know, before making an adjustment to a gesture, how much adjustment to make to the gesture to achieve a desired corresponding adjustment in the underlying data that the user seeks to manipulate via the gesture. An embodiment further makes such knowledge available to the user via guide markings relative to an initial placement of the gesture. Another embodiment allows the user to adjust a degree of correspondence between an adjustment to the gesture and a corresponding adjustment of the data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for guiding gesture operations, the method comprising:
    determining an initial size of a gesture, wherein the gesture is a two-finger touch-based gesture made by a user relative to a touch-sensitive interface of a data processing system, and wherein the gesture is made to manipulate data presented using the data processing system;
    determining a set of adjustments to the size of the gesture, forming a set of gesture size adjustments;
    computing, using a processor and a memory, a set of adjustments to be made to the data, forming a set of data adjustments, wherein an adjustment in the set of data adjustments corresponds to an adjustment in the set of gesture size adjustments; and
    presenting, as a guide, the set of gesture size adjustments and the corresponding set of data adjustments, wherein the guide displays a current display state for the data in correspondence with a marking showing the initial size of the gesture, wherein the guide is usable for informing the user about an expected result of a member gesture size adjustment in the set of gesture size adjustments before the user makes the gesture size adjustment.

2. The method of claim 1, further comprising:
    determining a scaling level, where a scaling level establishes a degree of adjustment to the data to be applied in response to a gesture size adjustment in the set of gesture size adjustments, to form a data adjustment in the set of data adjustments, wherein the data adjustment in the set of data adjustments corresponds to the gesture size adjustment in the set of gesture size adjustments.

3. The method of claim 2, wherein the scaling level is a proportionality factor between the gesture size adjustment and the data adjustment.

4. The method of claim 1, wherein the expected result of the gesture size adjustment comprises a data adjustment corresponding to the member gesture size adjustment that can be expected from making the gesture size adjustment.

5. The method of claim 1, where the presenting further comprises:
    displaying a visual guide for adjusting the gesture from the initial size to a final size.

6. The method of claim 1, wherein the size of the gesture is a distance between a reference point and a touch point in the gesture, and wherein the gesture has an adjusted size after an adjustment from the set of adjustments is made to the initial size of the gesture.

7. The method of claim 1, wherein the gesture accomplishes a zoom operation on the data by changing the relative positioning of two fingers on the touch-sensitive interface, and wherein the member gesture size adjustment comprises the changing the relative positioning of the two fingers on the touch-sensitive interface.

8. A computer usable program product comprising a non-transitory computer usable storage device including computer usable code for guiding gesture operations, the computer usable code comprising:
    computer usable code for determining an initial size of a gesture, wherein the gesture is a two-finger touch-based gesture made by a user relative to a touch-sensitive interface of a data processing system, and wherein the gesture is made to manipulate data presented using the data processing system;
    computer usable code for determining a set of adjustments to the size of the gesture, forming a set of gesture size adjustments;
    computer usable code for computing, using a processor and a memory, a set of adjustments to be made to the data, forming a set of data adjustments, wherein an adjustment in the set of data adjustments corresponds to an adjustment in the set of gesture size adjustments; and
    computer usable code for presenting, as a guide, the set of gesture size adjustments and the corresponding set of data adjustments, wherein the guide displays a current display state for the data in correspondence with a marking showing the initial size of the gesture, wherein the guide is usable for informing the user about an expected result of a member gesture size adjustment in the set of gesture size adjustments before the user makes the gesture size adjustment.

9. The computer usable program product of claim 8, further comprising:
    computer usable code for determining a scaling level, where a scaling level establishes a degree of adjustment to the data to be applied in response to a gesture size adjustment in the set of gesture size adjustments, to form a data adjustment in the set of data adjustments, wherein the data adjustment in the set of data adjustments corresponds to the gesture size adjustment in the set of gesture size adjustments.

10. The computer usable program product of claim 9, wherein the scaling level is a proportionality factor between the gesture size adjustment and the data adjustment.

11. The computer usable program product of claim 8, wherein the expected result of the gesture size adjustment comprises a data adjustment corresponding to the member gesture size adjustment that can be expected from making the gesture size adjustment.

12. The computer usable program product of claim 8, where the computer usable code for presenting further comprises:
 computer usable code for displaying a visual guide for adjusting the gesture from the initial size to a final size.

13. The computer usable program product of claim 8, wherein the size of the gesture is a distance between a reference point and a touch point in the gesture, and wherein the gesture has an adjusted size after an adjustment from the set of adjustments is made to the initial size of the gesture.

14. The computer usable program product of claim 8, wherein the gesture accomplishes a zoom operation on the data by changing the relative positioning of two fingers on the touch-sensitive interface, and wherein the member gesture size adjustment comprises the changing the relative positioning of the two fingers on the touch-sensitive interface.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for guiding gesture operations, the data processing system comprising:
 a storage device including a storage medium, wherein the storage device stores computer usable program code; and
 a processor, wherein the processor executes the computer usable program code, and wherein the computer usable program code comprises:
 computer usable code for determining an initial size of a gesture, wherein the gesture is a two-finger touch-based gesture made by a user relative to a touch-sensitive interface of a data processing system, and wherein the gesture is made to manipulate data presented using the data processing system;
 computer usable code for determining a set of adjustments to the size of the gesture, forming a set of gesture size adjustments;
 computer usable code for computing, using a processor and a memory, a set of adjustments to be made to the data, forming a set of data adjustments, wherein an adjustment in the set of data adjustments corresponds to an adjustment in the set of gesture size adjustments; and
 computer usable code for presenting, as a guide, the set of gesture size adjustments and the corresponding set of data adjustments, wherein the guide displays a current display state for the data in correspondence with a marking showing the initial size of the gesture, wherein the guide is usable for informing the user about an expected result of a member gesture size adjustment in the set of gesture size adjustments before the user makes the gesture size adjustment.

18. The data processing system of claim 17, further comprising:
 computer usable code for determining a scaling level, where a scaling level establishes a degree of adjustment to the data to be applied in response to a gesture size adjustment in the set of gesture size adjustments, to form a data adjustment in the set of data adjustments, wherein the data adjustment in the set of data adjustments corresponds to the gesture size adjustment in the set of gesture size adjustments.

19. The data processing system of claim 18, wherein the scaling level is a proportionality factor between the gesture size adjustment and the data adjustment.

20. The data processing system of claim 17, wherein the expected result of the gesture size adjustment comprises a data adjustment corresponding to the member gesture size adjustment that can be expected from making the gesture size adjustment.

* * * * *